US011341364B2

(12) United States Patent
Bousmalis et al.

(10) Patent No.: US 11,341,364 B2
(45) Date of Patent: May 24, 2022

(54) USING SIMULATION AND DOMAIN ADAPTATION FOR ROBOTIC CONTROL

(71) Applicant: GOOGLE LLC, Mountain View, CA (US)

(72) Inventors: Konstantinos Bousmalis, London (GB); Alexander Irpan, Palo Alto, CA (US); Paul Wohlhart, Sunnyvale, CA (US); Yunfei Bai, Sunnyvale, CA (US); Mrinal Kalakrishnan, Palo Alto, CA (US); Julian Ibarz, Sunnyvale, CA (US); Sergey Vladimir Levine, Berkeley, CA (US); Kurt Konolige, Menlo Park, CA (US); Vincent O. Vanhoucke, San Francisco, CA (US); Matthew Laurance Kelcey, Melbourne (AU)

(73) Assignee: Google LLC, Mountain View, CA (US)

( * ) Notice: Subject to any disclaimer, the term of this patent is extended or adjusted under 35 U.S.C. 154(b) by 203 days.

(21) Appl. No.: 16/649,599

(22) PCT Filed: Sep. 20, 2018

(86) PCT No.: PCT/US2018/052069
§ 371 (c)(1),
(2) Date: Mar. 20, 2020

(87) PCT Pub. No.: WO2019/060626
PCT Pub. Date: Mar. 28, 2019

(65) Prior Publication Data
US 2020/0279134 A1 Sep. 3, 2020

(30) Foreign Application Priority Data
Sep. 20, 2017 (GR) .............................. 20170100421

(51) Int. Cl.
G06K 9/62 (2022.01)
B25J 9/16 (2006.01)
(Continued)

(52) U.S. Cl.
CPC ............ *G06K 9/6256* (2013.01); *B25J 9/161* (2013.01); *B25J 9/1605* (2013.01); *B25J 9/1697* (2013.01);
(Continued)

(58) Field of Classification Search
CPC ..... G06K 9/6256; G06K 9/628; B25J 9/1605; B25J 9/161; B25J 9/1697; G06N 3/0454; G06N 3/084; G06N 3/006
(Continued)

(56) References Cited

U.S. PATENT DOCUMENTS

2018/0345496 A1* 12/2018 Li ........................... G06T 17/00
2019/0084151 A1* 3/2019 Bai ........................ B25J 9/1671

OTHER PUBLICATIONS

Levine, "Learning Hand-Eye Coordination for Robotic Grasping with Deep Learning and Large-Scale Data Collection," arxiv.org/abs/1603.02199, Aug. 28, 2016 (Year: 2016).*
(Continued)

Primary Examiner — Juan A Torres
(74) Attorney, Agent, or Firm — Fish & Richardson P.C.

(57) ABSTRACT

Methods, systems, and apparatus, including computer programs encoded on computer storage media, for training an action selection neural network that is used to control a robotic agent interacting with a real-world environment.

20 Claims, 5 Drawing Sheets

(51) Int. Cl.
*G06N 3/04* (2006.01)
*G06N 3/08* (2006.01)

(52) U.S. Cl.
CPC ........... *G06K 9/628* (2013.01); *G06N 3/0454* (2013.01); *G06N 3/084* (2013.01)

(58) Field of Classification Search
USPC ........................................................ 382/157
See application file for complete search history.

(56) References Cited

OTHER PUBLICATIONS

Bilen et al., "Universal representations: the missing link between faces, text, planktons, and cat breeds", arXiv:170L07275v1, Jan. 2017, 10 pages.

Bousmalis et al., "Unsupervised pixel-level domain adaption with generative adversarial networks", Proceedings of the 2017 IEEE Computer Society Conference on Computer Vision and Pattern Recognition, Jul. 2017, pp. 95-104.

Dosovitskiy et al., "Generating Images with Perceptual Similarity Metrics based on Deep Networks", Advances in Neural Information Processing Systems, 2016, 9 pages.

Ganin et al., "Domain-adversarial training of neural networks", Journal of Machine Learning Research, Apr. 2016, 14(59):1-35.

International Search Report and Written Opinion in International Application No. PCT/US2018/052069, dated Jan. 9, 2019, 19 pages.

Li et al., "Revisiting batch normalization for practical domain adaptation", arXiv:1603.04779v4, Nov. 2016, 12 pages.

Russo et al., "From source to target and back: symmetric bi-directional adaptive GAN", arXiv:1705.08824v1, May 2017, 10 pages.

Shen et al., "APE-GAN: Adversarial perturbation elimination with GAN", arXiv: 1707.05474v2, Sep. 2017, 14 pages.

Shrivastava et al., "Learning from simulated and unsupervised images through adversarial training", Proceedings of the 2017 IEEE Computer Society Conference on Computer Vision and Pattern Recognition, Jul. 2017, pp. 2242-2251.

EP Office Action in European Application No. 18792600.1, dated Dec. 9, 2021, 11 pages.

Tzeng et al., "Towards adapting deep visuomotor representations from simulated to real environments" arXiv, 2016, 10 pages.

\* cited by examiner

USING SIMULATION AND DOMAIN ADAPTATION FOR ROBOTIC CONTROL

CROSS-REFERENCE TO RELATED APPLICATION

This application claims priority to Patent Application Serial Number 20170100421, filed in the Hellenic Industrial Property Organisation (OBI) on Sep. 20, 2017, the entire contents of which are hereby incorporated by reference.

BACKGROUND

This specification relates to controlling robotic agents.

In some cases, a robotic agent interacts with an environment by performing actions that are selected by a system in response to receiving observations that characterize the current state of the environment.

Some systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a system that trains an action selection neural network for use in selecting actions to be performed by a robotic agent interacting with a real-world environment. In particular, the system leverages simulation data obtained from a simulated version of the robotic agent interacting with a simulated version of the environment to improve the training of the action selection neural network.

The subject matter described in this specification can be implemented in particular embodiments so as to realize one or more of the following advantages.

Implementations of the system facilitate improved training of action selection neural networks that are used to control robots interacting with a real-world environment. As a result, improved robotic agents may thus be achieved by virtue of the improvement in their control.

Large amounts of simulated training data with accurate labels for robotic control can be generated relatively easily. Simulated training data is training data that is generated using a computer program simulation of a real-world environment. Real-world training data for robotic control, i.e., data gathered through actual interaction of the robotic agent with the real-world environment, on the other hand, is time-intensive and resource-intensive to collect, results in mechanical wear on the robotic agent, and can have noisy labels.

However, simulated training data is difficult to employ in effectively training an action selection neural network for use in controlling a real-world robotic agent interacting with the real-world environment. That is, directly using the simulation training data for training the action selection neural network without accounting for the fact that the simulation training data is drawn from a different domain (simulation) than the intended domain (real-world) will generally result in the trained action selection neural network performing poorly at controlling the real-world robot.

Some of the reasons for this poor performance can include that a specific simulation may not generalize well to an entire real-world environment and that the simulated data is systematically different from counterpart real-world data, e.g., because the real-world environment is less structured and predictable than the simulated environment, because images of the real-world environment appear differently from images of the simulated environment, and because dynamics of the real-world robotic agent can differ somewhat from the simulated version of the agent.

This specification describes various techniques for effectively incorporating simulation images into the training of the action selection neural network, thereby greatly increasing the amount of high-quality training data available for training the network. In particular, this specification describes techniques for using a generator neural network to adapt simulation images before the adapted images are used to train the neural network and techniques for training the action selection neural network effectively to account for the fact that at least some of the training images are adapted from simulation. This results in improved performance of the trained network and of the robotic agent in performing the robotic task, even when the neural network is used to control the robotic agent using only monocular images of the environment captured by the sensors of the robot. By incorporating simulation images into the training, the need to generate large labeled datasets of real-world environment interactions is greatly reduced. Therefore, mechanical wear on the robotic agent during learning of the control policy is avoided.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
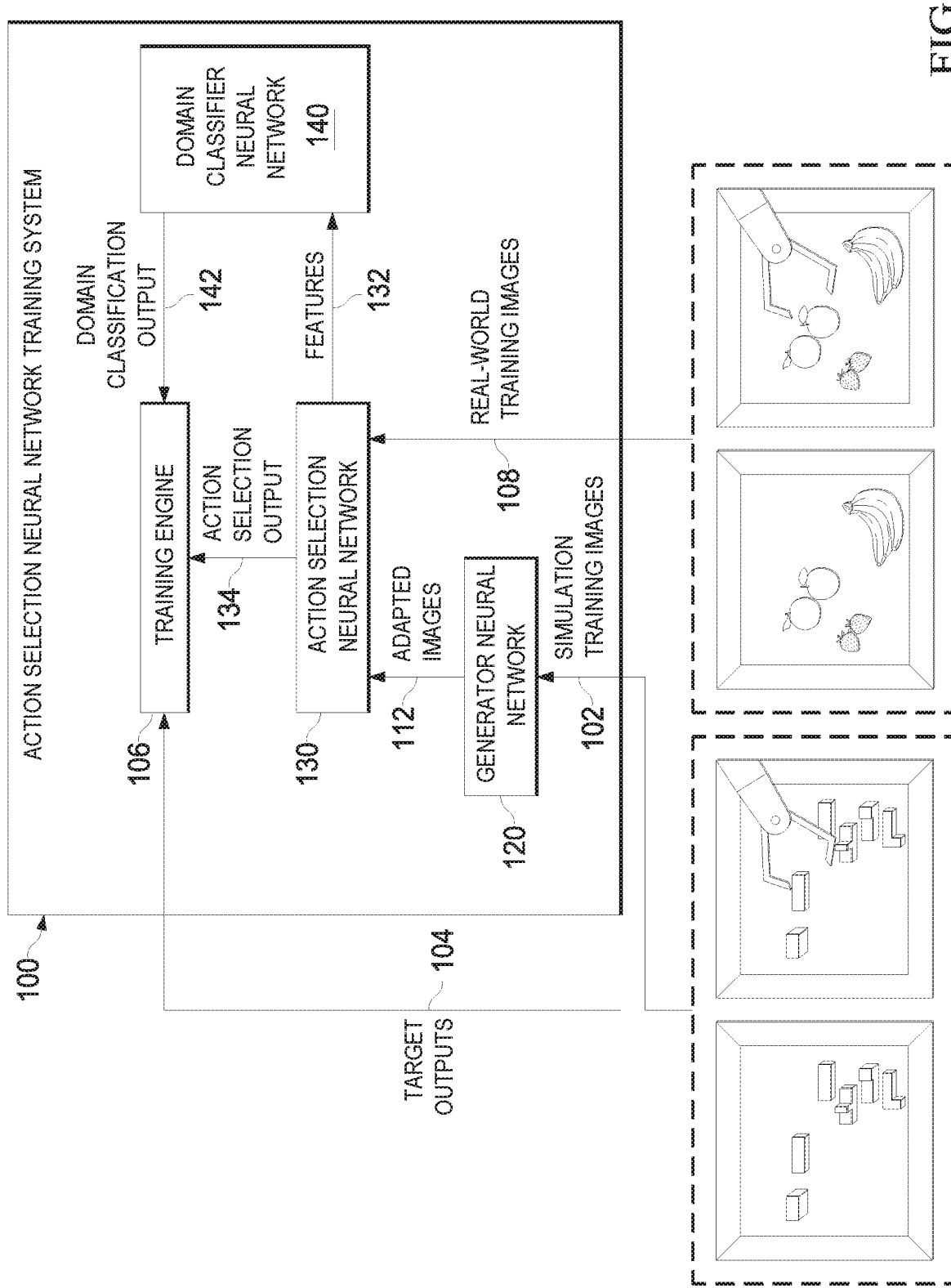
FIG. 1 shows an example action selection neural network training system.

This specification generally describes controlling a robotic agent as the robotic agent interacts with a real-world environment, i.e., selecting actions to be performed by the robotic agent to cause the agent to interact with the real-world environment. The robotic agent can be, e.g., a robotic arm or another, more complex robot that is controllable to change position within the environment.

In order for the agent to interact with the real-world environment, a system receives one or more images characterizing the current state of the environment and selects an action to be performed by the agent using the received images. In particular, the system selects the actions so that the robotic agent can successfully perform a robotic task, e.g., an object grasping task, an object moving task, a navigation task, or another task that requires the agent to interact with the real-world environment for some specific purpose.

The system selects actions to be performed by the robotic agent using an action selection neural network. The action selection neural network is configured to receive an action selection input including one or more images of the real-world environment and to process the action selection input in accordance with the parameters of the network, referred to in this specification as action selection parameters, to generate an action selection output for use by the system in selecting actions to be performed by the robotic agent to interact with the real-world environment to perform the robotic task. The action selection output may then be used to control the robotic agent.

As an example, each action selection input can include an image of the current state of the real-world environment and a candidate action, and the action selection output can be a score that represents a predicted likelihood that the robotic agent will successfully perform the task if the candidate action is performed when the real-world environment is in the current state. The action selection input can also optionally include an image of an initial state of the real-world environment, i.e., an image of the state of the environment before the agent begins performing the task. Each candidate action can be a candidate motor command for the robotic agent, i.e., can specify torques for one or more joints of the robotic agent.

The system can control the robotic agent using such an action selection neural network, i.e., select actions using the output of an action selection neural network that generates scores that represent predicted likelihoods, in any of a variety of ways. For example, at each time step, the system can randomly sample a set of candidate motor commands and then select the candidate motor command with the highest score as generated by the action selection neural network when processed in combination with the initial image and the current image from the time step. As another example, at each time step, the system can perform an optimization on the set of candidate motor commands using the action selection neural network and then select a candidate motor command based on the results of the optimization. These and other techniques for selecting actions using the output of the action selection neural network are described in more detail in Levine, Sergei et al, "Learning Hand-Eye Coordination for Robotic Grasping with Deep Learning and Large-Scale Data Collection," arXiv: 1603.02199 [cs.LG].

To allow the action selection neural network to effectively be used to select actions to be performed by the robotic agent, the system or a separate system trains the action selection neural network to update the values of the action selection parameters.

FIG. 1 shows an example action selection neural network training system 100. The action selection neural network training system 100 is an example of a system implemented as computer programs on one or more computers in one or more locations, in which the systems, components, and techniques described below are implemented.

As described above, the system 100 trains an action selection neural network 130 to allow the neural network 130 to effectively be used to select actions to be performed by a robotic agent interacting with a real-world environment, i.e., so that actions selected using the neural network 130 cause the robotic agent to successfully perform the robotic task.

As part of training the action selection neural network, the system 100 obtains a plurality of simulation training inputs. Each simulation training input includes one or more simulation images 102 of a simulated version of the real-world environment captured while a simulated version of the robotic agent interacts with the simulated version of the real-world environment to perform a simulated version of the robotic task.

The simulated version of the environment is one or more computer programs that model the dynamics of the real-world environment. Thus, actions performed by the simulated version of the robotic agent in the simulated environment have the same or similar impact as actions performed by the robotic agent in the real-world environment. However, because the simulated version of the environment is a simulation, images of the simulated version of the environment appear different from images of the real-world environment and may have other systematic differences from real-world images.

When the action selection neural network 130 takes as input an image of an initial state of the real-world environment, an image of the current state of the real-world environment, and a candidate action, each simulated training input includes an image of an initial state of the simulated environment, an image of a current state of the simulated environment, and an action that was performed by the simulated agent when the environment was in the current state.

In some cases, the system 100 obtains the simulation training inputs from another system, i.e., the system 100 does not control the simulation.

In other cases, however, the system 100 executes the simulation, i.e., as one or more computer programs, and collects the simulation training inputs as a result of executing the simulation. In these cases, the system 100 can utilize various techniques to improve the usefulness of the simulation training data in training the action selection neural network 130. In particular, the system 100 can randomize the randomizing the visual appearance of the simulated environment, the dynamics of the simulated environment or both. For example, the system can modify the dynamics of the simulated environment by adding randomly sampled noise to the selected action commands. As another example, the system can modify the dynamics by modifying the object mass of objects in the environment, the object lateral/rolling/spinning friction coefficients or other dynamics of objects in the environment, or both. As another example, the system can modify the visual appearance of the simulated environment by modifying one or more of: object texture, object color, robot color, lighting direction, or brightness within the environment.

The system 100 also obtains a plurality of real-world training inputs. Each real-world training input includes one or more real-world images 108 of the real-world environment captured while the robotic agent interacts with the real-world environment to perform the robotic task. In particular, when the action selection neural network 130 takes as input an image of an initial state of the real-world environment, an image of the current state of the real-world environment, and a candidate action, each real-world training input includes an image of an initial state of the real-world environment, an image of a current state of the real-world environment, and an action that was performed by the robotic agent when the environment was in the current state.

In some cases, either the real-world training inputs, the simulation training inputs, or both can be gathered and obtained gradually during the training of the action selection neural network and as a result of interactions controlled using the action selection neural network, i.e., so that the training inputs reflect the improved performance of the robotic agent on the robotic task as training progresses.

The system 100 also obtains a respective target output 104 for each simulated training input and each real-world training input. The target output 104 for a given training input is an output that should be generated by the action selection neural network 130 by processing the training input. When the output of the action selection neural network 130 is a likelihood that the task will successfully be completed, the target output for a given training input identifies whether the task was successfully completed after the action in the training input was performed.

The system 100 generates a plurality of adapted training inputs from the simulation training inputs by processing the simulation images 102 using a generator neural network 120 having a plurality of generator parameters. The generator neural network 120 is configured to, for each simulated image 102 in each simulation training input, process the simulated image 102 in accordance with trained values of the generator parameters to generate an adapted image 112 that appears to be an image of the real-world environment. That is, the generator neural network 120 has been trained to generate adapted images 112 from simulation training images 102 that maintain the semantics of the simulation training image 102 but that appear as if they are real-world images of the real-world environment. The generator neural network 120 and training the generator neural network 120 are described in more detail below with reference to FIGS. 3 and 4.

The system 100 then trains the action selection neural network 130 on the adapted training inputs and the real-world training inputs to determine trained values of the action selection parameters from first values of the action selection parameters. In some cases, the first values of the action selection parameters are initial values, i.e., random values or values generated using some other appropriate neural network training parameter initializing procedure. In other cases, the first values are generated by pre-training the action selection neural network 130 jointly with the generator neural network 120 as described below with reference to FIGS. 3 and 4.

In particular, the system 100 trains the action selection neural network 130 jointly with a domain classifier neural network 140.

The domain classifier neural network 140 is configured to, for each real-word training input or simulation training input, process features 132 generated by the action selection neural network 130 for the training input to predict the domain of the input, i.e., classify the input as being a real-world training input or a simulation training input.

The features 132 of a given training input are generally the outputs of a predetermined layer of the action selection neural network 130. Thus, as will be described in more detail below with reference to FIG. 2, the domain classifier neural network 140 receives as input features of a training input that are generated by the action selection neural network 130 and predicts, from the features, whether the features are features of a real-world input or a simulation training input.

By training the action selection neural network 130 jointly with the domain classifier neural network 140, the system 100 trains the action selection neural network 130 to generate accurate action selection outputs for both real-world training inputs and adapted training inputs while generating features that are invariant between real-world training inputs and adapted training inputs, i.e., so that the domain classifier neural network 140 cannot accurately predict the original domain of the inputs based on the features.

More specifically, the system 100 includes a training engine 106 that uses the action selection outputs 134, the domain classification outputs 142, the target outputs 104, and ground truth domain labels for the training inputs to train the action selection neural network 130 and the domain classifier neural network 140.

In particular, the training engine 106 trains the action selection neural network 130 to generate accurate action selection outputs while also training the domain classifier neural network 140 to maximize classification accuracy of the domain classifier neural network 140 while penalizing the action selection neural network 130 for generating features 132 that are accurately classified by the domain classifier neural network 140.

In other words, the training engine 106 trains the action selection neural network 130 to minimize a task-specific loss that measures the accuracy of the action selection outputs, e.g., a binomial cross-entropy loss between the action selection outputs 134 and the corresponding target outputs 104 while simultaneously performing a minimax optimization of a domain—adversarial neural network (DANN) loss that measures a cross entropy between the domain classifications 142 and the corresponding ground truth domain labels.

As part of the minimax optimization, the training engine 106 trains the shared layers, i.e., the layers up to and including the predetermined layer that generates the features in the action selection neural network, to maximize the DANN loss, while training the domain classifier adversarially to minimize the DANN loss. This minimax optimization can be implemented by a gradient reversal layer (GRL). The GRL has the same output as the identity function, but negates the gradient during backpropagation, allowing the gradient for both the domain classifier and the shared feature extractor to be computed in a single backward pass.

During the training, the system 100 can repeatedly update the values of the action selection parameters and the domain classifier parameters by backpropagating gradients of the task-specific loss and the DANN loss for different batches of training inputs through the layers of the action selection neural network 130 and the domain classifier neural network 140.

Once the action selection neural network 130 has been trained, the system 100 can use the trained neural network to select actions to be performed by the robotic agent to effectively interact with the real-world environment or can output data specifying the trained neural network for later use, i.e., by the system 100 or another system, in controlling the robotic agent. The robotic agent may then implement these selections.

Figure 2:
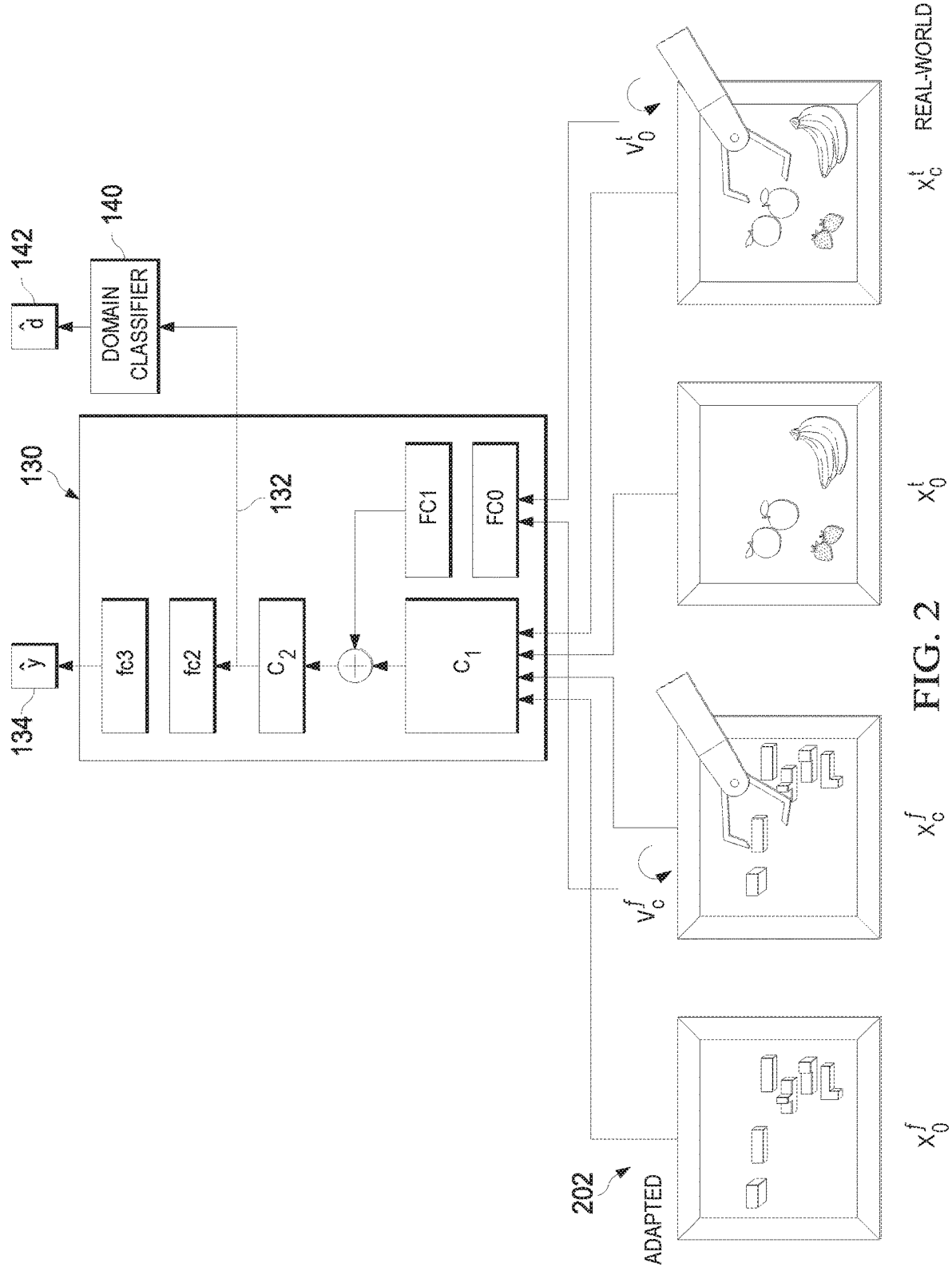
FIG. 2 shows an example architecture of the action selection neural network.

FIG. 2 is a diagram that shows an example architecture of the action selection neural network 130. In the example of FIG. 2, the action selection neural network 130 is configured to receive an input 202 that is either an adapted training input or a real-world training input. That is, the input 202 includes either (i) an initial adapted image $x_o^f$, a current adapted image $x_c^f$ and a vector $v_c^f$ that represents a current simulated action (i.e., a vector of torques for the joints of the robotic agent) or (ii) an initial real-world image $x_o^t$, a current real-world image $x_c^t$, and a vector $v_c^t$ that represents a current real-world action.

The action selection neural network 130 includes a first block of convolutional neural network layers C1 that processes the images in the input 202 to generate an initial representation of the images and a sequence of fully-connected layers (i.e., fc0 and fc1) that processes the action vector in the input 202 to generate an initial representation of the action vector. The initial representations are then combined, e.g., summed or concatenated, and the combination is processed using a second block of convolutional neural network layers C2 to generate a set of features 132 of the input 202. The features are processed using another sequence of fully-connected layers (i.e., fc2 and fc3) to generate the action selection output 132, i.e., the likelihood ŷ that the task will be successfully completed. Thus, in the example of FIG. 2, the "shared layers" referred to above are the first block of convolutional neural network layers, the sequence of fully-connected layers that process the action vector and the second block of convolutional neural network layers. In other examples, however, the features can be the output of a different predetermined layer within the action selection neural network 130.

The features 132 are also provided as input to the domain classifier neural network 140. The domain classifier neural network 140 can include, for example, a sequence of fully-connected neural network layers that process the features 132 to generate the domain classification output 142, i.e., the output d that classifies the input 202 as either a real-world input or a simulation input.

In some cases, some or all of the layers in the action selection neural network 130 are followed by a batch normalization layer. Generally, a batch normalization layer that is after a given layer in a neural network improves the training of the neural network by, during processing of a batch of training inputs, normalizing outputs generated by the given layer during training based on batch statistics generated by the batch normalization layer. The batch statistics are generally the mean and standard deviation of the outputs generated by the given layer for the batch of inputs.

In some of these cases, the batch statistics used by the batch normalization layers in the action selection neural network are calculated without regard for whether the inputs in the batch are real-world inputs or adapted inputs. However, in practice, the two domains tend to have different statistics, and maintaining batch statistics in this manner can degrade the effectiveness of the training process.

Thus, in some cases, the batch normalization layers in the action selection neural network 130 are domain-specific batch normalization layers. Each domain-specific batch normalization layer is configured to maintain separate batch normalization statistics for adapted training inputs and real-world training inputs, i.e., so that outputs generated for adapted training inputs do not impact statistics for real-world training inputs and vice versa. The domain-specific batch normalization layers are then configured to apply batch normalization to adapted training inputs using the batch normalization statistics for the adapted training inputs and apply batch normalization to real-world training inputs using the batch normalization statistics for the real-world training inputs. Applying batch normalization in this manner can mitigate the impact of inputs from the two domains having different statistics on the training process.

Figure 3:
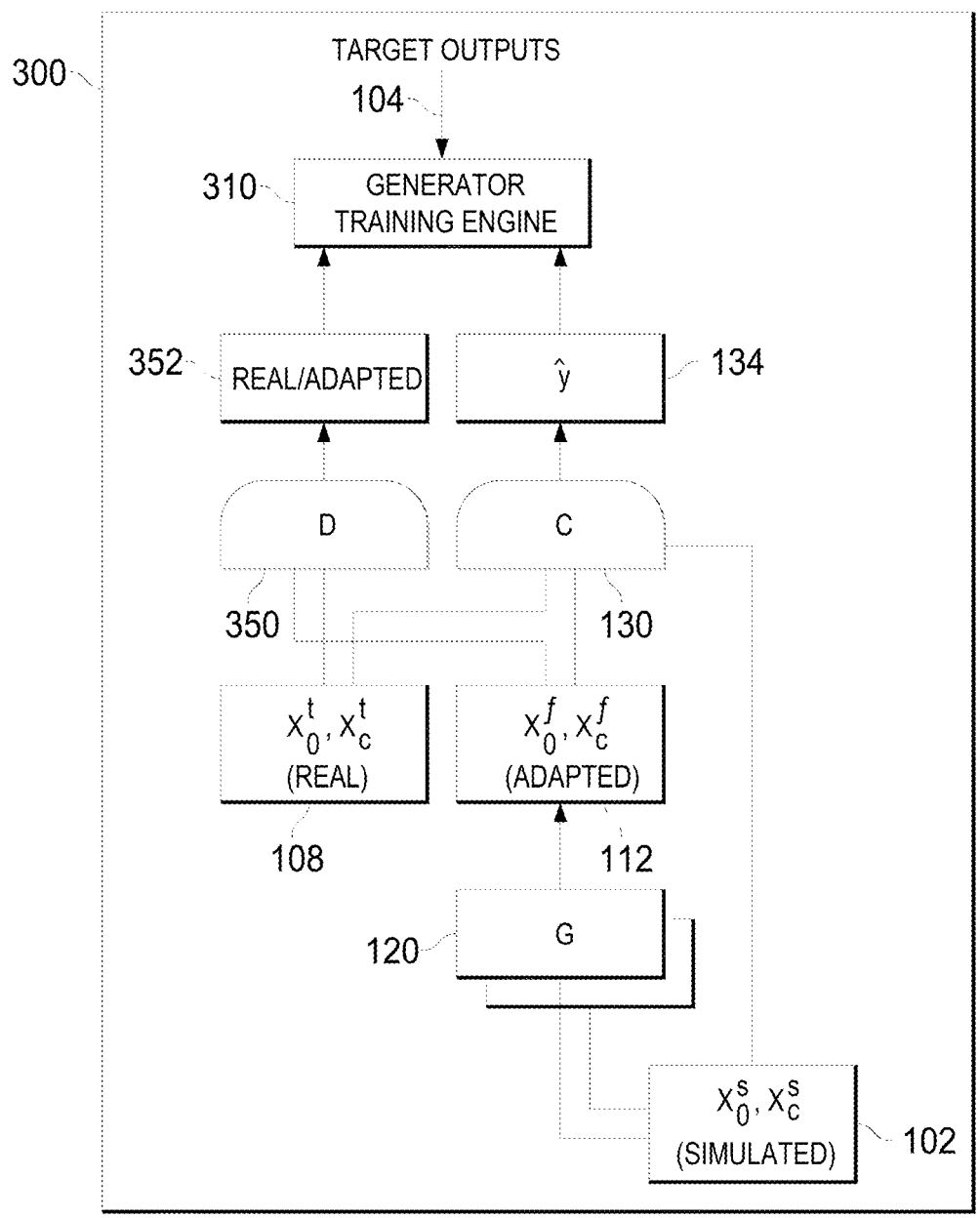
FIG. 3 shows an example generator neural network training system.

FIG. 3 shows an example generator neural network training system 300. The generator neural network 120 training system 300 is an example of a system implemented as computer programs on one or more computers in one or more locations, in which the systems, components, and techniques described below for training the generator neural network 120 are implemented. The generator neural network training system 300 can be implemented on the same computers as the action selection neural network training system 100 or on different computers.

The generator neural network 120 training system 300 trains the generator neural network 120 so that the trained generator neural network 120 can be used in training the action selection neural network 130.

As described above, the generator neural network 120 is configured to process a simulation image in accordance with current values of the generator parameters to generate an adapted image that appears to be an image of the real-world environment.

The system 300 trains the generator neural network 120 jointly with a discriminator neural network 350 and with a task-specific neural network that is configured to generate an output that is specific to the robotic task that the action selection neural network 130 is configured to perform.

In some implementations, the task-specific neural network is the action selection neural network 130. That is, the system 300 pre-trains the action selection neural network 130 jointly with the generator neural network 120 to determine the first values of the action selection parameters referred to above. The system 100 of FIG. 1 then continues to train the action selection neural network 130 to determine the trained values of the action selection parameters while holding the trained values of the generator parameters fixed as described above.

In other implementations, the task-specific neural network can be a different neural network, e.g., a neural network having a different, simplified architecture relative to the action selection neural network 130 but configured to generate the same kind of output or a neural network configured to generate a different kind of output that is relevant to the robotic task.

The discriminator neural network 350 is configured to receive input images, i.e., either real-world images 108 or adapted images 112 generated by the generator neural network 120, and generate a discriminator output 352 that classifies the input images as either being adapted images or real-world images. In some cases, the discriminator neural network 350 is configured to receive the input images one at a time. In other cases, the discriminator neural network 350 is configured to receive input images in pairs, i.e., an initial training image and a current training image, and to classify the pair of images as being adapted or real-world. Additionally, as described in more detail below with reference to FIG. 4, in some implementations the discriminator neural network 350 is a multi-scale, patch-based neural network that generates respective classifications for each of multiple patches of the input image(s). These classifications can be combined to generate the discriminator output 352.

The system 300 includes a generator training engine 310 that trains the neural networks jointly by alternating between performing a first optimization step and performing a second optimization step.

In the first optimization step, the generator training engine 310 minimizes a first loss function with respect to the generator parameters. That is, in the first optimization step, the generator training engine 310 updates the generator parameters by backpropagating gradients of the first loss function into the generator neural network 120. In the second optimization step, the generator training engine 310 minimizes a second loss function with respect to the action selection parameters and the discriminator parameters. That is, in the second optimization step, the generator training engine 310 updates the discriminator parameters and the action selection parameters by backpropagating gradients of the second loss function into the discriminator neural network 350 and the action selection neural network.

The system can repeatedly alternate performing the first optimization step and the second optimization step on different batches of training inputs to jointly train the neural networks.

The first loss function generally includes at least a generator loss term and a task loss term.

The generator loss term measures how well the discriminator neural network 350 classifies adapted images generated by the generator neural network 120, i.e., a term that has a high loss if the discriminator accurately classifies an adapted image. For example, when a score of zero corresponds to an adapted image, the generator loss term can be the difference between the likelihood output and one. Thus, this loss penalizes the generator neural network 120 for generating adapted images that are accurately classified by the discriminator neural network 350.

The task loss term measures how accurate the action selection neural network outputs are for adapted training inputs, i.e., relative to the target outputs 104. For example, the task loss can be the binomial cross-entropy loss described above. Thus, this loss penalizes the generator neural network 120 for generating adapted images that result in inaccurate action selection neural network outputs being generated by the action selection neural network.

Optionally, the first loss function can include one or more additional terms. In particular, the first loss function can further include one or more content loss terms that penalize the generator neural network 120 for generating adapted images that are semantically different from the corresponding simulated images from which they are generated. The one or more content loss terms ensure that the generator, while making the input simulated image look like an image from the real world scenario, does not change the semantics of the simulated input, for instance by drawing the robot or the objects in the environment in different positions. Otherwise, the information extracted from the simulation in order to train the action selection neural network would not correspond anymore to the generated image.

For example, as will be described in more detail below with reference to FIG. 4, the generator neural network 120 can be further configured to generate one or more segmentation masks of the input simulated images and the content loss terms can include a term that penalizes the generator neural network 120 for incorrectly segmenting the input simulated image, e.g., implemented as an L2 reconstruction loss.

As another example, the content loss terms can include a term that penalizes differences in activations of a particular layer of the action selection neural network, e.g., the same layer as generates the features described above, between an adapted image and the corresponding simulated image.

As yet another example, the context loss terms can include a loss term that penalizes the generator neural network 120 for a generated adapted image deviating from the input simulation image. For example, the loss term can be a pairwise mean squared error (PMSE) loss that penalizes differences between pairs of pixels rather than absolute differences between inputs and outputs. In some cases, the loss is a masked version of the MPSE loss that calculates the PMSE between the generated foreground and the source foreground, i.e., so that both pixels in the pair are in the foreground of their respective images.

The second loss function generally includes at least a discriminator loss term and a task loss term.

The discriminator loss term measures how well the discriminator neural network 350 classifies input images, i.e., a term that has a high loss if the discriminator does not accurately classify an input image. For example, when a score of zero corresponds to an adapted image and a score of one corresponds to a real-world image, the discriminator loss term can be the difference between the likelihood output generated by the discriminator for the input image and the ground truth score for the input image.

The task loss term in the second loss function can be the same term as used in the first loss function.

Thus, the generator training engine 310 trains the generator neural network 120 to generate high-quality adapted images, i.e., images that cannot be accurately classified by the discriminator neural network 350 while also being useful in generating accurate selection outputs.

Figure 4:
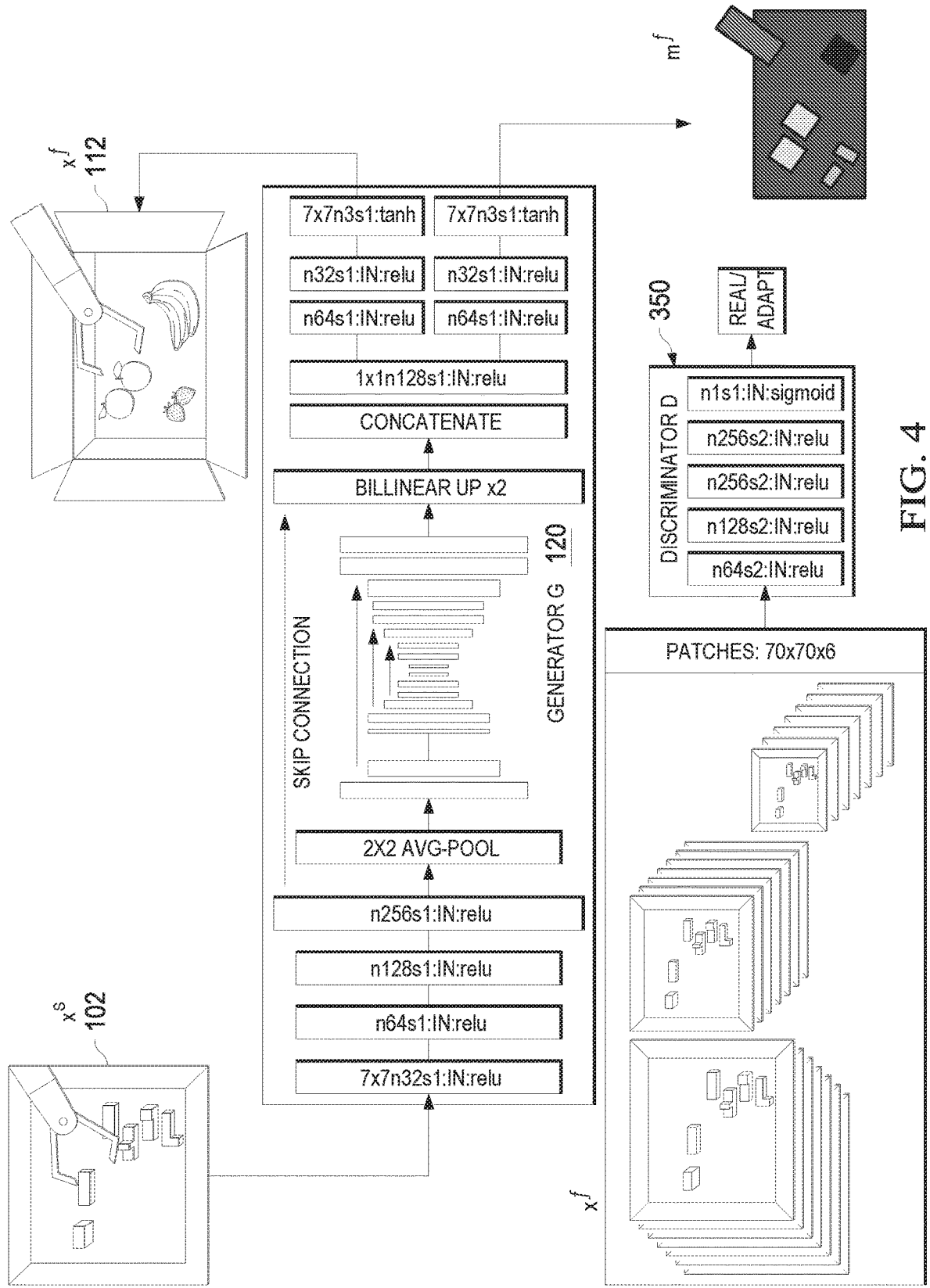
FIG. 4 shows an example architecture for the generator neural network and the discriminator neural network.

FIG. 4 shows example architectures of the generator neural network 120 and the discriminator neural network 350.

As can be seen in FIG. 4, the generator neural network 120 receives an input simulated image 102 and generates as output an adapted image 112 that, after the generator neural network 120 has been trained, maintains the semantics of the input simulated image but appears to be an image of the real-world environment.

In the particular example of FIG. 4, the generator neural network 120 is a convolutional neural network that follows a U-Net architecture, uses average pooling ("avg-pool") for downsampling, bilinear upsampling ("bilinear up"), concatenation and 1×1 convolutions for the U-Net skip connections, and instance normalization ("IN"). In the notation of FIG. 4, "n64s2:IN:relu," for example, means 64 filters, stride 2, instance normalization and relu activation.

Additionally, in the example of FIG. 4, the generator neural network 120 is configured to generate a segmentation output 410. The segmentation output 410 is one or more segmentation masks over the input simulated image 102 that segment the portions of the input simulated image 102 that belong to pre-determined categories, e.g., the background of the image, portions of the image that depict the robotic agent or other objects in the environment, and so on.

In the example of FIG. 4, the discriminator neural network 350 operates on pairs of input images, i.e., an initial image and a current image, stacked into a 6 channel input. More specifically the discriminator neural network 350 is configured to receive as input a plurality of patches from the six channel input, with each patch being at a different scale. In the example of FIG. 4, there are 3 patches at 3 different scales, e.g., 472×472, 236×236, and 118×118. The discriminator neural network 350, then, is a fully convolutional neural network that operates on each of the patches to classify each patch as being from either an adapted image or a real-world image. The outputs for each patch are then combined to compute the discriminator loss. This multi-scale patch-based discriminator design can learn to assess both global consistency of the generated image, as well as realism of local textures. Stacking the channels of the two input images enables the discriminator 350 to recognize relationships between the two images, so it can encourage the generator 120 to respect them, i.e., to generate adapted images that do not modify relationships between the initial image and the current image.

Figure 5:
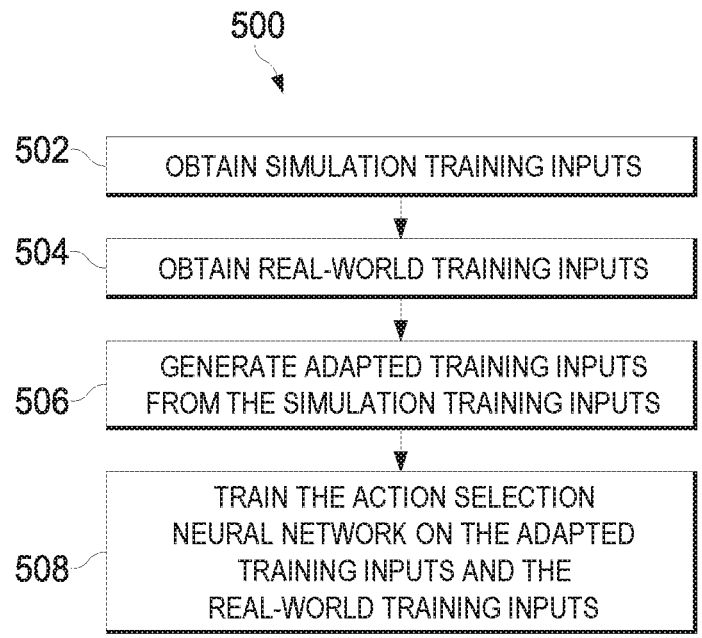
FIG. 5 is a flow chart of an example process for training the generator neural network.

FIG. 5 is a flow diagram of an example process 500 for training an action selection neural network. For convenience, the process 500 will be described as being performed by a system of one or more computers located in one or more locations. For example, an action selection neural network training system, e.g., the action selection neural network training system 100 of FIG. 1, appropriately programmed, can perform the process 500.

The system obtains a plurality of simulation training inputs (step 502). As described above, each simulation training input includes one or more simulation images of a simulated version of the real-world environment captured while a simulated version of the robotic agent interacts with the simulated version of the real-world environment to perform a simulated version of the robotic task.

The system obtains a plurality of real-world training inputs (step 504). As described above, each real-world training input includes one or more real-world images of the real-world environment captured while the robotic agent interacts with the real-world environment to perform the robotic task.

The system generates a plurality of adapted training inputs from the simulation training inputs by processing the simulation images using the generator neural network to generate, for each simulation image in each simulation training input, a respective adapted image that appears to be an image of the real-world environment (step 506). In particular, the system processes the simulation images using the trained generator neural network as described above with reference to FIG. 1.

The system trains the action selection neural network on the adapted training inputs and the real-world training inputs to determine the trained values of the action selection parameters from the first values of the action selection parameters (step 508). In particular, the system trainings the action selection neural network to generate accurate action selection outputs for both real-world training inputs and adapted training inputs while generating features that are invariant between real-world training inputs and adapted training inputs as described above with reference to FIGS. 1 and 2.

Figure 6:
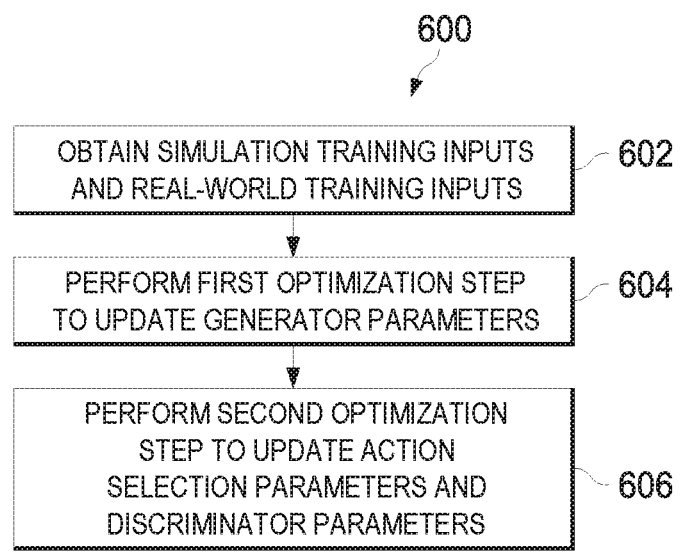
FIG. 6 is a flow chart of an example process for training the action selection neural network.

FIG. 6 is a flow diagram of an example process 600 for training a generator neural network. For convenience, the process 600 will be described as being performed by a system of one or more computers located in one or more locations. For example, a generator neural network training system, e.g., the generator neural network training system 300 of FIG. 3, appropriately programmed, can perform the process 600.

The system obtains simulation training inputs and real-world training inputs (step 602). The simulation and real-world training inputs can be the same as those used to train the action selection neural network, a subset of those used to train the action selection neural network, or can be different from those used to train the action selection neural network.

The system performs a first optimization step to update the generator parameters (step 604). In the first optimization step, the system minimizes a first loss function to cause the generator neural network to generate higher-quality adapted images as described above with reference to FIGS. 3 and 4.

The system performs a second optimization step to update the discriminator parameters and the action selection parameters (or the parameters of the other task-specific neural network that is being trained jointly with the generator neural network) (step 606). In the second optimization step, the system minimizes a second loss function to cause the discriminator neural network to improve at classifying input images as either adapted or real and to cause the action selection neural network to generate higher-quality action selection outputs as described above with reference to FIGS. 1 and 2.

The system can repeatedly alternate between performing step 604 and step 606 to jointly train the generator neural network, the action selection neural network, and the discriminator neural network.

The above description describes that labeled real-world training data is used to train the action selection neural network after the generator neural network has been trained. However, in some cases, labeled real-world training data is not available. In these cases, unlabeled real-world training data and labeled simulation training data can be used to train the generator neural network and then only labeled adapted training data generated form the simulation training data can be used to train the action selection neural network. Thus, the action selection neural network can be trained effectively if the only real-world data available is a limited number of unlabeled real-world images.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training an action selection neural network having a plurality of action selection parameters,
    wherein the action selection neural network is configured to receive an action selection input comprising one or more images of a real-world environment and to process the action selection input in accordance with the action selection parameters to generate an action selection output for use in selecting actions to be performed by a robotic agent interacting with the real-world environment to perform a robotic task, and
    wherein the method comprises:
        obtaining a plurality of simulation training inputs, each simulation training input comprising one or more simulation images of a simulated version of the real-world environment captured while a simulated version of the robotic agent interacts with the simulated version of the real-world environment to perform a simulated version of the robotic task;
        obtaining a plurality of real-world training inputs, each real-world training input comprising one or more real-world images of the real-world environment captured while the robotic agent interacts with the real-world environment to perform the robotic task;
        generating a plurality of adapted training inputs from the simulation training inputs by processing the simulation images using a generator neural network having a plurality of generator parameters, wherein the generator neural network is configured to, for each simulation image in each simulation training input, process the simulation image in accordance with trained values of the generator parameters to generate an adapted image that appears to be an image of the real-world environment; and
        training the action selection neural network on the adapted training inputs and the real-world training inputs to determine trained values of the action selection parameters from first values of the action selection parameters, comprising training the action selection neural network to generate accurate action selection outputs for both real-world training inputs and adapted training inputs while generating features that are invariant between real-world training inputs and adapted training inputs.

2. The method of claim 1,
    wherein the features are outputs of a predetermined layer in the action selection neural network.

3. The method of claim 1, wherein the action selection neural network comprises one or more domain-specific batch normalization layers, and wherein each domain-specific batch normalization layer is configured to:
    maintain separate batch normalization statistics for adapted training inputs and real-world training inputs;
    apply batch normalization to adapted training inputs using the batch normalization statistics for the adapted training inputs; and
    apply batch normalization to real-world training inputs using the batch normalization statistics for the real-world training inputs.

4. The method of claim 1, wherein the action selection input includes an image of an initial state of the real-world environment, an image of a current state of the real-world environment, and a candidate action, and wherein the action selection output is a score that represents a predicted likelihood that the robotic agent will successfully perform the robotic task if the candidate action is performed when the real-world environment is in the current state.

5. The method of claim 1, further comprising, prior to training the action selection neural network on the adapted training inputs and the real-world training inputs to determine trained values of the action selection parameters from first values of the action selection parameters:
    training the generator neural network to determine the trained values of the generator parameters from initial values of the generator parameters.

6. The method of claim 1, further comprising controlling the robotic agent in accordance with the action selection output.

7. The method of claim 2,
    wherein training the action selection neural network on the adapted training inputs and the real-world training inputs to determine trained values of the action selection parameters from first values of the action selection parameters comprises:
        training the action selection neural network jointly with a domain classifier neural network that is configured to, for each real-word training input or simulation training input, process the features generated by the action selection neural network for the training input to classify the training input as being a real-world training input or a simulation training input, and
    wherein training the action selection neural network jointly with the domain classifier neural network comprises training the domain classifier neural network to maximize classification accuracy of the domain classifier neural network while penalizing the action selection neural network for generating features that are accurately classified by the domain classifier neural network.

8. The method of claim 5, wherein training the generator neural network comprises:
training the generator neural network jointly with the action selection neural network and a discriminator neural network having a plurality of discriminator parameters to determine the trained values of the generator parameters, the first values of the action selection parameters, and trained values of the discriminator parameters,
and wherein the discriminator neural network is configured to receive one or more input images and to classify the images as either adapted images or real-world images.

9. The method of claim 8, wherein training the generator neural network jointly with the action selection neural network and the discriminator neural network comprises:
alternating between performing a first optimization step and performing a second optimization step, wherein performing the first optimization step comprises:
minimizing a first loss function with respect to the generator parameters, wherein the first loss function includes:
(i) a generator loss term, and
(ii) a task loss term.

10. The method of claim 8, wherein the discriminator neural network is configured to receive as input a plurality of patches from the one or more input images and to classify each patch as being from either an adapted image or a real-world image.

11. The method of claim 9, wherein performing the second optimization step comprises:
minimizing a second loss function with respect to the discriminator parameters and the action selection parameters, wherein the second loss function includes:
(i) a discriminator loss term, and
(ii) a task loss term.

12. The method of claim 9, wherein the first loss function further includes one or more content loss terms that penalize the generator neural network for generating adapted images that are semantically different from the corresponding simulation images.

13. The method of claim 10, wherein each patch is at a different scale.

14. The method of claim 12, wherein the generator neural network is further configured to generate one or more segmentation masks of the input simulation images, and wherein the content loss terms include a term that penalizes the generator neural network for incorrectly segmenting the input simulation image.

15. The method of claim 12, wherein the content loss terms include a term that penalizes differences in activations of a particular layer of the action selection neural network between an adapted image and the corresponding simulation image.

16. A system comprising one or more computers and one or more storage devices storing instructions that when executed by the one or more computers cause the one or more computers to perform operations for training an action selection neural network having a plurality of action selection parameters,
wherein the action selection neural network is configured to receive an action selection input comprising one or more images of a real-world environment and to process the action selection input in accordance with the action selection parameters to generate an action selection output for use in selecting actions to be performed by a robotic agent interacting with the real-world environment to perform a robotic task, and
wherein the operations comprise:
obtaining a plurality of simulation training inputs, each simulation training input comprising one or more simulation images of a simulated version of the real-world environment captured while a simulated version of the robotic agent interacts with the simulated version of the real-world environment to perform a simulated version of the robotic task;
obtaining a plurality of real-world training inputs, each real-world training input comprising one or more real-world images of the real-world environment captured while the robotic agent interacts with the real-world environment to perform the robotic task;
generating a plurality of adapted training inputs from the simulation training inputs by processing the simulation images using a generator neural network having a plurality of generator parameters, wherein the generator neural network is configured to, for each simulation image in each simulation training input, process the simulation image in accordance with trained values of the generator parameters to generate an adapted image that appears to be an image of the real-world environment; and
training the action selection neural network on the adapted training inputs and the real-world training inputs to determine trained values of the action selection parameters from first values of the action selection parameters, comprising training the action selection neural network to generate accurate action selection outputs for both real-world training inputs and adapted training inputs while generating features that are invariant between real-world training inputs and adapted training inputs.

17. The system of claim 16, wherein the features are outputs of a predetermined layer in the action selection neural network.

18. The system of claim 16, wherein the action selection neural network comprises one or more domain-specific batch normalization layers, and wherein each domain-specific batch normalization layer is configured to:
maintain separate batch normalization statistics for adapted training inputs and real-world training inputs;
apply batch normalization to adapted training inputs using the batch normalization statistics for the adapted training inputs; and
apply batch normalization to real-world training inputs using the batch normalization statistics for the real-world training inputs.

19. The system of claim 17,
wherein training the action selection neural network on the adapted training inputs and the real-world training inputs to determine trained values of the action selection parameters from first values of the action selection parameters comprises:
training the action selection neural network jointly with a domain classifier neural network that is configured to, for each real-word training input or simulation training input, process the features generated by the action selection neural network for the training input to classify the training input as being a real-world training input or a simulation training input, and
wherein training the action selection neural network jointly with the domain classifier neural network comprises training the domain classifier neural network to maximize classification accuracy of the domain classifier neural network while penalizing the action selection neural network for generating features that are accurately classified by the domain classifier neural network.

20. One or more non-transitory computer storage media storing instructions that when executed by one or more computers cause the one or more computers to perform operations for training an action selection neural network having a plurality of action selection parameters, wherein the action selection neural network is configured to receive an action selection input comprising one or more images of a real-world environment and to process the action selection input in accordance with the action selection parameters to generate an action selection output for use in selecting actions to be performed by a robotic agent interacting with the real-world environment to perform a robotic task, and wherein the operations comprise:

obtaining a plurality of simulation training inputs, each simulation training input comprising one or more simulation images of a simulated version of the real-world environment captured while a simulated version of the robotic agent interacts with the simulated version of the real-world environment to perform a simulated version of the robotic task;

obtaining a plurality of real-world training inputs, each real-world training input comprising one or more real-world images of the real-world environment captured while the robotic agent interacts with the real-world environment to perform the robotic task;

generating a plurality of adapted training inputs from the simulation training inputs by processing the simulation images using a generator neural network having a plurality of generator parameters, wherein the generator neural network is configured to, for each simulation image in each simulation training input, process the simulation image in accordance with trained values of the generator parameters to generate an adapted image that appears to be an image of the real-world environment; and training the action selection neural network on the adapted training inputs and the real-world training inputs to determine trained values of the action selection parameters from first values of the action selection parameters, comprising training the action selection neural network to generate accurate action selection outputs for both real-world training inputs and adapted training inputs while generating features that are invariant between real-world training inputs and adapted training inputs.

* * * * *